United States Patent
Tipton et al.

(10) Patent No.: US 9,791,717 B2
(45) Date of Patent: Oct. 17, 2017

(54) MOLDING APPARATUS AND METHOD

(71) Applicant: Ocutec Limited, Bellshill (GB)

(72) Inventors: Wade Tipton, Bellshill (GB); Arthur Reid, Bellshill (GB)

(73) Assignee: OCUTEC LIMITED, Bellshill (GB)

( * ) Notice: Subject to any disclaimer, the term of this patent is extended or adjusted under 35 U.S.C. 154(b) by 0 days.

(21) Appl. No.: 14/766,427

(22) PCT Filed: Feb. 7, 2014

(86) PCT No.: PCT/GB2014/050374
§ 371 (c)(1),
(2) Date: Aug. 6, 2015

(87) PCT Pub. No.: WO2014/122476
PCT Pub. Date: Aug. 14, 2014

(65) Prior Publication Data
US 2015/0370091 A1    Dec. 24, 2015

(30) Foreign Application Priority Data

Feb. 8, 2013  (GB) .................................. 1302268.6

(51) Int. Cl.
*G02C 7/04* (2006.01)
*B29D 11/00* (2006.01)

(52) U.S. Cl.
CPC .............. *G02C 7/049* (2013.01); *B29D 11/00* (2013.01); *B29D 11/00009* (2013.01);
(Continued)

(58) Field of Classification Search
CPC .......... G02C 7/049; G02C 7/04; B29D 11/00; B29D 11/00009; B29D 11/00038; B29D 11/00576
(Continued)

(56) References Cited

U.S. PATENT DOCUMENTS

| 3,087,284 A | 4/1963 | Kratt |
| 3,594,074 A * | 7/1971 | Rosen ...................... G02C 7/04 |
| | | 351/219 |

(Continued)

FOREIGN PATENT DOCUMENTS

GB    1 511 901 A    5/1978

OTHER PUBLICATIONS

International Preliminary Report on Patentability issued on PCT/GB2014/050374, mailed Aug. 11, 2015.
(Continued)

*Primary Examiner* — William R Alexander
(74) *Attorney, Agent, or Firm* — Foley & Lardner LLP (57) ABSTRACT

According to the present invention, there is provided a contact lens assembly comprising a contact lens having an outer edge, a flash ring disposed around the outer edge of the contact lens and a connecting portion connecting the flash ring to the contact lens, wherein the thickness of the connecting portion is less than the thickness of the outer edge of the contact lens. There is also provided a contact lens assembly comprising a contact lens having an outer edge, a flash ring disposed around the outer edge of the contact lens, and a connecting portion connecting the flash ring to the contact lens wherein the mass of the flash ring is at least forty times greater than the mass of the contact lens, suitably at least sixty times greater than the mass of the contact lens. There is also provided a contact lens injection molding apparatus comprising first and second molding parts moveable relative to each other between a compressed and an uncompressed position, wherein in the compressed position, an outer edge of the first molding part is disposed 1 to 50 μm from an outer edge of the second molding part.

16 Claims, 4 Drawing Sheets

(52) U.S. Cl.
CPC .. *B29D 11/00038* (2013.01); *B29D 11/00576* (2013.01); *G02C 7/04* (2013.01)

(58) Field of Classification Search
USPC .......................... 351/159.02, 159.01, 159.73
See application file for complete search history.

(56) References Cited

U.S. PATENT DOCUMENTS

| | | | | |
|---|---|---|---|---|
| 4,955,580 | A * | 9/1990 | Seden | A45C 11/005 249/82 |
| 5,776,381 | A | 7/1998 | Haase | |
| 6,405,993 | B1 * | 6/2002 | Morris | B29D 11/00057 249/141 |
| 7,586,697 | B2 * | 9/2009 | Kuroda | G02B 7/022 359/649 |
| 8,287,269 | B2 * | 10/2012 | Dubey | B29D 11/00057 249/160 |
| 2002/0093113 | A1 | 7/2002 | Ansell et al. | |
| 2003/0160343 | A1 * | 8/2003 | Hodgkinson | B29C 33/44 264/1.1 |
| 2005/0142240 | A1 | 6/2005 | Chiu | |
| 2006/0145372 | A1 * | 7/2006 | Jones | B29C 45/2673 264/1.32 |
| 2007/0132124 | A1 * | 6/2007 | Dubey | B29C 33/0038 264/1.32 |
| 2007/0296096 | A1 * | 12/2007 | Bruce | B29C 33/202 264/1.36 |
| 2008/0031997 | A1 * | 2/2008 | Bazzo | B29C 45/2806 425/562 |
| 2008/0217800 | A1 * | 9/2008 | Kernick | B29D 11/00192 264/1.38 |
| 2010/0013114 | A1 * | 1/2010 | Bowers | A61L 27/18 264/2.1 |
| 2010/0149482 | A1 * | 6/2010 | Ammon, Jr. | G02C 7/04 351/159.34 |
| 2011/0089584 | A1 * | 4/2011 | Plaza | B29C 37/0007 264/1.1 |
| 2014/0035176 | A1 * | 2/2014 | Hamilton | B29D 11/00192 264/2.2 |

OTHER PUBLICATIONS

International Search Report for PCT/GB2014/050374, mailed Apr. 24, 2014.

* cited by examiner

MOLDING APPARATUS AND METHOD

REFERENCE TO RELATED APPLICATIONS

This application is the US National Phase Entry of International Patent Application No. PCT/GB2014/050374 filed Feb. 7, 2014, which claims priority to GB Patent Application No. 1302268.6 flied Feb. 8, 2013.

The present invention relates to an apparatus for forming a molded article, in particular a contact lens. There is also provided a method for molding.

BACKGROUND TO THE INVENTION

Soft contact lenses offer a viable alternative to spectacles for the correction of visual defects such as myopia, hyperopia and astigmatism.

Manufacturing of contact lenses has been the subject of numerous studies and patent applications over the last thirty years. Substantial effort has been directed towards developing new manufacturing technologies which can be fast, reliable, industrially applicable and substantially reduce lens cost.

One process which holds considerable promise to achieve these objectives is direct injection moulding of thermoplastic polymers. Thermoplastic materials which are suitable for contact lens manufacture are known (see for instance WO 2011/055110 and WO 2011/055108hereby incorporated by reference). These poly (ethylene glycol) based polymers exhibit a number of superior properties such as increased oxygen permeability and resistance to lens dehydration both of which can improve the safety and comfort of a lens.

Injection moulding is used to manufacture a wide range of medical devices such as urological, cardiovascular and thoracic drain catheters. These products are formed from large moulds and commonly require secondary finishing in order to make the device suitable for use.

Articles of manufacture formed from current injection moulding apparatus and techniques commonly comprise a witness mark or sprawl. This may take the form of additional material protruding out of the article of manufacture.

In contrast, contact lenses are very thin parts (typical around 100 µm thin) and require an optical centre and a precision edge which plays a key role in determining the comfort of a lens. Due to both comfort, safety and optical concerns, witness marks or sprawls are clearly not acceptable for contact lenses. Additional material protruding into the eye will greatly increase the discomfort and irritability associated with the contact lens, as well as increasing the risk of scratching of the outside surface of the eye.

In the past it has proved difficult to mold contact lenses having the required physical dimensions due to the relatively small size, and the accuracy necessary to obtain the required optical properties.

The Centre Thickness of a Contact lens in the zero gel state is circa 90 µm. It has previously been found that in order to directly injection mould into a cavity area this thin would require pressures & speeds that exceed the capability of a standard injection moulding machine. Using standard injection pressures and speeds would result in voids, flow marks and surface defects that would render the lens unsuitable for on eye use.

There is a need therefore for a fast, reliable direct injection moulding apparatus and method capable of forming these parts as well as providing a significant reduction of lens manufacture cost of goods compared to existing multi-step manufacturing step based processes which are currently used to form lenses.

The present invention provides an apparatus suitable for the manufacture of articles of manufacture such as contact lenses.

Problems

It is currently problematic to injection mould a contact lens as the gate allowing ingress of the composition to be moulded leaves an unacceptable witness mark. Even after trimming, such a witness mark does not allow adequate surface and optical properties to allow on-eye use. In addition, the secondary operation of trimming increases the cost and complexity of the moulding process.

It is difficult to form small moulded articles accurately. For instance, the centre thickness of a contact lens in the zero gel state is circa 90 µm. Directly injection moulding into a cavity area this thin would require pressures & speeds that exceed the capability of a standard injection moulding apparatus. Using standard injection pressures and speeds, of for instance speeds of 100 mm/s and maximum injection pressures of 2100 Bar/specific would result in voids, flow marks and surface defects that may render the resultant contact lens unsuitable for on eye use.

In order to achieve a molding process involving a high through put and low cost of goods, rapid ejection of the contact lens from the mould is important. Ejection of a contact lens from a mould is difficult due to the formation of a vacuum between the relatively thin contact lens wall and the mould surfaces.

Retaining the physical parameters of a contact lens as moulded during removal of the contact lens from the mould, and during the removal of the contact lens from any attached waste composition is problematic. If the contact lens is not removed correctly, mechanical, optical, physical and edge properties may be lost which may render the contact lens unsuitable for on eye use.

STATEMENT OF INVENTION

According to an aspect of the present invention there is provided a compression injection molded contact lens.

According to an aspect of the present invention there is provided a contact lens assembly comprising a contact lens having an outer edge, a flash ring disposed around the outer edge of the contact lens and a connecting portion connecting the flash ring to the contact lens, wherein the thickness of the connecting portion is less than the thickness of the outer edge of the contact lens.

According to an aspect of the present invention there is provided a contact lens assembly comprising a contact lens having an outer edge, a flash ring disposed around the outer edge of the contact lens, and generally a connecting portion connecting the flash ring to the contact lens wherein the mass of the flash ring is at least fifty times greater than the mass of the contact lens.

According to an aspect of the present invention there is provided a contact lens assembly comprising a contact lens having an outer edge, a flash ring disposed around the outer edge of the contact lens, and generally a connecting portion connecting the flash ring to the contact lens wherein the witness mark is provided on the flash ring.

According to an aspect of the present invention there is provided an apparatus suitable for compression injection molding a contact lens. This is in contrast to standard injection molding techniques which do not involve compression.

According to an aspect of the present invention there is provided a contact lens injection molding apparatus comprising first and second molding parts moveable relative to each other between a compressed and an uncompressed position, wherein in the compressed position, an outer edge of the first molding part is disposed 1 to 20 μm from an outer edge of the second molding part.

According to an aspect of the present invention there is provided a method for molding a contact lens comprising the step of compression injection molding a composition to form the contact lens.

According to an aspect of the present invention there is provided a method of forming a contact lens comprising the step of:
1. providing the apparatus as described herein;
2. providing a melted thermoplastic composition to be molded in a spacing between the first and second molding parts in the uncompressed position;
3. moving the first and second molding parts into the compressed position; and
4. cooling the thermoplastic composition to form the contact lens.

Generally the contact lens of step 4 is in the form of the contact lens assembly as described above and the method includes the steps of:
5. removing the contact lens assembly from the apparatus; and
6. separating the contact lens from the contact lens assembly, generally by punching the contact lens from the contact lens assembly.

According to an aspect of the present invention there is provided a contact lens obtainable by the methods described herein.

According to a further aspect of the present invention there is provided a contact lens molded from the apparatus described herein, or according to the method described herein wherein said contact lens does not include a witness mark.

DEFINITIONS

The term "gate" is used to refer to the inlet which allows ingress of the composition to be molded into the vicinity of the contact lens mold, in particular into the overflow portion.

The term "witness mark" is used to refer to a surface mark or defect, generally associated with the gate and suitably occurring at or around the gate area.

The term "flash ring" is used to refer to additional material disposed proximal to the contact lens, or connected to the contact lens but not forming part of the contact lens, in particular not forming part of the required shape or dimensions of the contact lens. Generally the flash ring is disposed proximal to at least a portion of the outer edge of the contact lens, typically around the entire circumference of the contact lens. Contact lenses generally comprise a substantially circular circumference, and the inner edge of the flash ring is typically substantially circular. Generally the flash ring is formed at least in part from the composition to be molded which has been moved from the contact lens mold to the overflow portion during movement of the molding parts from the uncompressed to the compressed positions. Additionally or alternatively, the flash ring may be formed in part from composition to be molded which has entered the area around the contact lens mold via the gate.

The term "injection molding" (IM) is used to refer to molding techniques involving the molding of thermoplastic compositions. The thermoplastic composition is injected through a flow or fluid channel into a molding cavity Contact Lens Assembly According to an aspect of the present invention there is provided a contact lens assembly comprising a contact lens having an outer edge, a flash ring disposed around the outer edge of the contact lens and a connecting portion connecting the flash ring to the contact lens, wherein the thickness of the connecting portion is less than the thickness of the outer edge of the contact lens.

The "thickness" of the contact lens is used to refer to the distance between the on-eye surface of the contact lens which in use would be provided towards or on the eye of the wearer, and the outward facing surface of the contact lens which in use would be provided away from the eye of the wearer. Likewise, the "thickness" of the connecting portion is used to refer to the distance between the surface of the connecting portion facing the same way as the on-eye surface of the contact lens and the surface of the connecting portion facing the same way as the outward facing surface of the contact lens.

The provision of the relatively thin connecting portion means that the contact lens can be punched out of the contact lens assembly. The connecting portion will break before any damage is done to the contact lens, allowing the contact lens to be separated from the flash ring.

As the connecting portion breaks, the shape and dimensions of the contact lens as molded are maintained. In particular, the edge profile of the contact lens as molded is maintained. This is an important advantage as in the past it has been difficult to form contact lenses having a defined and predictable edge profile from thermoplastic material. Removal methods involving the application of heat or laser along the connecting portion do not maintain the edge profile of the lens as molded. In particular, cutting and laser procedures essentially form a new edge to the lens. In contrast, the contact lens assembly of the present invention allows removal of the contact lens through punching mechanisms, allowing the edge profile of the contact lens as molded to be maintained.

A reliable method of forming a compression injection molded contact lens having defined, predictable dimensions and edge profile is thus provided.

The outer edge of the contact lens may generally be considered to be 0 to 1 mm from the outer circumference of the contact lens, typically 0 to 0.5 mm.

According to one embodiment, the thickness of the connecting portion is 50 μm or less, generally 1 to 50 μm, typically 5 to 50 μm, more typically 10 to 50 μm, suitably 10 to 20 μm. The thickness of the connecting portion may be around 10 μm.

As noted above, the thickness of the connecting portion is less than the thickness of the outer edge of the lens. Typically the contact lens has a thickness of 60 to 100 μm within 0 to 1 mm of its outer edge, generally 70 to 100 μm, suitably around 90 μm.

The thickness of the connecting portion is generally 50% or less than the thickness of the outer edge of the contact lens, suitably 25% or less than the thickness of the outer edge of the contact lens.

The connecting portion generally extends radially from the outer edge of the lens. Generally the connecting portion radially extends around at least 75% of the circumference of the lens, typically around the entire circumference of the lens. Suitably the connecting portion radially extends 2 to 5 mm from the circumference of the lens.

The provision of a connecting portion promotes accurate placement of the contact lens assembly on the removal mechanism used to remove the contact lens from the contact lens assembly. In particular, the provision of a connecting portion extending 2 to 5 mm from the circumference of the lens promotes accurate placement of the contact lens assembly on a die which when used in combination with a punch or cutter may remove the contact lens from the contact lens assembly.

According to one embodiment, the connecting portion is thinner towards the outer edge of the contact lens than towards the flash ring portion. This promotes breakage of the connecting portion towards the outer edge of the contact lens during punching of the contact lens from the contact lens assembly. Generally the connecting portion is 10 to 20% thinner towards the outer edge of the contact lens than towards the flash ring portion.

The bulk of the flash ring promotes ease of removal of the contact lens from the molding parts. Generally the mass of the flash ring is more than forty times greater than the mass of the contact lens, typically at least fifty times greater, suitably at least sixty times greater than the mass of the contact lens.

According to one embodiment, the contact lens has a mass of around 0.01 to 0.05 grams, typically around 0.02 grams and the flash ring has a mass of around 1 to 1.5 grams, typically around 1.3 grams.

Generally, the contact lens may be removed from the contact lens assembly of the present invention whilst maintaining the edge profile of the contact lens, typically through punching the contact lens from the contact lens assembly.

Any required edge profile may be provided during the molding process through appropriate shaping of the first and second molding parts. However, it is generally difficult to retain the edge profile formed during the molding process following removal of the contact lens from the contact lens assembly. As noted above, many commonly used techniques to remove thermoplastic articles of manufacture from surrounding material do not maintain the edge profile formed during the molding process. Such removal processes include cutting, heating and laser techniques.

The contact lens assembly of the present invention allows the contact lens to be removed the flash ring easily and effectively whilst retaining the edge profile formed during the molding process. Generally the contact lens is removed through a punching mechanism.

Suitably the on eye surface and the outward facing surface of the contact lens narrow towards the edge of the contact lens.

According to one embodiment, both the on eye surface and the outward facing surface of the contact lens narrow towards the edge of the contact lens. Such an edge profile may be termed a chisel edge.

Alternatively the outward facing surface of the contact lens narrows towards the edge of the contact lens. Such an edge profile may be termed a dagger edge.

According to an aspect of the present invention there is provided a contact lens assembly comprising a contact lens having an outer edge, a flash ring disposed around the outer edge of the contact lens, and generally a connecting portion connecting the flash ring to the contact lens wherein the mass of the flash ring is at least forty times greater than the mass of the contact lens, generally at least fifty times greater.

The centre thickness of a contact lens is thin, typically less than 100 μm and is susceptible to damage and distortion. During molding processes, a vacuum may be formed between the mold and the lens, causing the lens stick to stick to the molding part. The lens is typically damaged and/or distorted during efforts to remove it from the molding part.

The contact lens assembly of the present invention is easily removable from the molding apparatus. In particular, the bulk of the flash ring promotes removal of the contact lens from the molding apparatus without any material from the contact lens remaining on the molding parts. Mechanical ejection of the contact lens assembly from the molding apparatus is facilitated accordingly. The bulk of the flash ring provides leverage to remove the contact lens from the molding parts. Any vacuum formed between the contact lens and the molding parts is generally also reduced in strength.

In order for the bulk of the flash ring to provide leverage in the removal of the contact lens assembly from the molding apparatus, the flash ring should not preferably detach during removal from the molding apparatus. The contact lens assembly should retain its structure during the removal process. Where the contact means assembly includes a connecting portion, the connecting portion should therefore be of sufficient strength to resist or prevent ripping during the removal process. Generally the connecting portion is at least 1 μm thick.

In such embodiments, the contact lens assembly does not necessarily comprise a connecting portion. The flash ring may be connected directly to the contact lens. Alternatively the connecting portion may be as thick as or thicker than the outer edge of the contact lens. The contact lens may then be removed from the contact lens assembly through, for instance, cutting, laser or heating techniques. The edge profile of the contact lens as formed during the molding process is generally not maintained if such removal processes are used. A new edge is typically provided during the removal process.

In such embodiments, the edge profile of the contact lens may be controlled by controlling the angles of the cutting process.

According to an aspect of the present invention there is provided a contact lens assembly comprising a contact lens having an outer edge, a flash ring disposed around the outer edge of the contact lens, and generally a connecting portion connecting the flash ring to the contact lens wherein the witness mark is provided on the flash ring.

Following cooling of the thermoplastic composition during the molding process, a protrusion from the contact lens assembly is commonly formed at the location where the gate providing the composition to be molded was located. Alternatively, a depression in the contact lens assembly may be formed at the location where the gate providing the composition to be molded was located. This depression or protrusion may be termed the "witness mark". Any such witness mark may be trimmed as a secondary operation in the manufacturing process. However, this increases the complexity and associated cost of the process.

In addition, a contact lens must be very precisely and accurately shaped to ensure that it is acceptable for use. Any depressions or protrusions in the surface of a contact lens can adversely affect the optical properties. In addition, discomfort, irritation and/or infection can be caused by any protrusions in the surface of the lens.

According to the method and apparatus of the present invention, the gate providing the composition to be molded is generally provided on the flash ring. Any associated witness mark is thus also provided on the flash ring. Following removal of the contact lens from the contact lens assembly, any witness mark associated with the gate remains on the flash ring which is generally discarded. The contact lens of the present invention accordingly has no witness mark on its surface. This increases the comfort of prolonged on-eye use and maximizes the optical properties of the contact lens. In addition, the cost and complexity of the process used to form the contact lens are reduced.

As noted above, in such embodiments, the contact lens assembly does not necessarily comprise a connecting portion. The flash ring may be connected directly to the contact lens. Alternatively the connecting portion may be as thick or thicker than the outer edge of the contact lens, and the contact lens is then generally removed from the contact lens assembly through for instance, cutting, heating or laser techniques.

According to one embodiment, one or more contact lens assemblies are connected, typically by one or more runner portion. The runner portion extends from an outlet of a reservoir of the thermoplastic material used to mold the contact lens assembly to the flash ring.

The composition used to form the contact lens assembly of the present invention may be any suitable thermoplastic composition. Generally it is a thermoplastic polymeric composition.

According to one embodiment, the composition is that disclosed in WO2011/055110 hereby incorporated by reference or WO2011/055108 hereby incorporated by reference.

The thermoplastic composition used to form the contact lens assembly of the present invention may be a polyurethane xerogel prepared from a mixture comprising:
(a) at least one polyethylene glycol;
(b) at least one di-isocyanate; and
(c) at least one diol of formula I,

I wherein n is an integer from 1 to 25, preferably 2 to 10, more preferably 2 to 4;
wherein the polyethylene glycol, di-isocyanate and diol are reacted under substantially anhydrous conditions.

Generally the contact lens, flash ring and connecting portion are formed from the same material, namely the composition to be molded.

The different embodiments of the present invention may be combined where appropriate. In addition, where appropriate, the description of suitable embodiments and or nonessential features may be combined with any of the embodiments of the invention as described herein.

Apparatus

According to an aspect of the present invention there is provided an apparatus suitable for molding a contact lens, wherein said apparatus comprises means for compression injection molding a composition to form the contact lens.

This is in contrast to standard injection molding techniques which do not involve compression.

According to an aspect of the present invention there is provided a contact lens injection molding apparatus comprising first and second molding parts moveable relative to each other between a compressed and an uncompressed position, wherein in the compressed position, an outer edge of the first molding part is disposed 1 to 50 μm from an outer edge of the second molding part.

Suitably the apparatus is used to form the contact lens assembly as described herein.

Generally in the compressed position, the outer edge of the first molding part is disposed 5 to 50 μm from an outer edge of the second molding part, typically 5 to 20 μm, suitably around 10 μm.

The composition to be molded can generally move from the spacing between the first and second molding parts during movement of the first and second molding parts from an uncompressed to a compressed position. If movement was prevented, the pressure in the composition would build up. Following removal of the compression forces, the dimensions of the contact lens would increase, and the precise shaping required for use as a contact lens would not be provided. In addition, the optical properties of the contact lens would be adversely affected.

In the compressed position, a contact lens mold is provided between the first and second molding parts. The contact lens mold has the dimensions of the contact lens to be formed.

Typically the entire outer edge of the first molding part is disposed at a substantially constant distance from the entire outer edge of the second molding part where the first and second molding parts are in the compressed position.

The apparatus of the present invention allows the composition to be molded under compression. This ensures that the cavity is completely or substantially filled with the composition to be molded and minimizes or prevents the formation of voids, flow marks and surface defects in the contact lens. In contrast, standard injection molding techniques are not generally suitable for the formation of small articles of manufacture such as contact lenses. For articles of manufacture having the dimensions of the same order of magnitude as a contact lens, the thermoplastic composition must be injected into the mold of conventional injection molding apparatus at very high pressures to ensure that each part of the mold is filled with the composition. Conventional injection molding apparatus is not normally suitable to withstand such elevated pressures.

According to one embodiment, the apparatus comprises an overflow portion disposed proximal to the outer edges of the first and second molding parts, wherein upon movement of the first and second molding parts from an uncompressed to a compressed position, the material to be molded may move from the spacing between the first and second molding parts to the overflow portion.

Generally the first and second molding parts are separated by 0.5 to 1 cm in the uncompressed position, and are separated by less than 200 μm in the compressed position. At least two times the volume of the contact lens mold generally moves from the spacing between the first and second molding parts to the overflow portion upon movement of the first and second molding parts from an uncompressed to a compressed position. The difference in volume between the first and second molding parts in the uncompressed and compressed positions means that the contact lens mold is completely filled, and reduces or prevents the occurrence of voids, flow marks and surface defects in the contact lens.

The spacing between the first and second molding parts in the compressed position generally provides the mold for the connecting portion. Suitably, the first and second molding parts are shaped to provide the dimensions of the connecting portion when in the compressed position.

Alternatively, the apparatus may comprise a connecting portion mold adjacent to the outer edges of the first and second molding parts.

The flash ring of the contact lens assembly of the present invention is generally molded in the overflow portion.

The composition to be molded may generally move freely between the overflow portion and the spacing between the first and second molding parts where the first and second molding parts are in the uncompressed position.

The apparatus generally includes a gate to allow ingress of the composition to be molded to the spacing between the first and second molding parts. Generally the overflow portion comprises the gate.

Any protrusion or depression, in particular any witness mark associated with the ingress of the composition to be molded, is thus formed on the flash ring rather than the contact lens. Any witness mark associated with the gate may thus be disposed of with the removal of the contact lens from the contact lens assembly.

The overflow portion generally defines a cavity having a volume at least forty times greater than the volume of the contact lens mold provided between the first and second molding parts in the compressed position. Typically the volume of the overflow portion is at least fifty times greater than the volume of the contact lens mold, suitably at least sixty times greater.

According to one embodiment, the first and second molding parts both narrow towards the outer edge thereof. This provides a contact lens having a "chisel" edge profile. Alternatively the second molding part only may narrow towards its outer edge. This provides a contact lens having a "dagger" edge profile.

Generally the shape, dimensions and edge profile of the contact lens as molded is maintained upon removal of the contact lens from the contact lens assembly.

According to one embodiment, the apparatus comprises a contact lens removal device, typically a biased removal device to separate the contact lens from the contact lens assembly. Generally the removal device is a punch, typically a spring loaded punch.

Generally the apparatus comprises means to control the temperature of the contact lens mold, in particular to allow the temperature of the contact lens mold to be controlled during the molding process. The temperature of the housing can be maintained at or around the melt temperature of the composition to be moulded throughout the compression phase to allow the polymer to flow freely under compression without causing additional stress in the lens. Controlling the mould temperature is advantageous as this allows the melt temperature of the composition to be moulded to be maintained, in particular during the compression phase in order to prevent stress in the contact lens. Stresses in the contact lens may cause distortion, which may result in loss of mechanical, optical, physical and edge properties. This may render the resultant article unsuitable for on eye use.

According to one embodiment, the apparatus comprises means to measure the temperature of the housing, generally a thermometer or a thermocouple in the first and/or second molding parts.

Method

According to an aspect of the present invention there is provided a method for molding a contact lens comprising the step of compression injection molding a composition to form the contact lens.

According to an aspect of the present invention there is provided a method of forming a contact lens comprising the steps of:
1. providing the apparatus as described herein;
2. providing a molten composition to be molded in a spacing between the first and second molding parts in the uncompressed position;
3. moving the first and second molding parts into the compressed position; and
4. cooling the composition to be molded to form the contact lens.

Typically the first and second molding parts and the overflow portion are heated to at least the melting temperature of the composition to be molded before the composition is introduced. Generally all surfaces of the apparatus which contact the composition to be molded are heated to at least the melting temperature of the composition to be molded before the composition is introduced.

It will be understood that the temperatures to be employed in the method of the invention are dependent on the melting temperature of the composition to be molded.

Controlling the temperature of the contact lens mould is advantageous as this allows the melt temperature of the composition to be moulded to be maintained, in particular whilst it is under compression and this prevents or alleviates stress in the contact lens. Stresses in the contact lens may cause distortion, which may result in loss of mechanical, optical, physical and edge properties. This may render the resultant article unsuitable for on-eye use.

The temperature of the contact lens mold is typically maintained no more than 10° C. above the melt temperature of the composition to be molded throughout the molding process.

Generally the temperature of the contact lens mold is maintained at no less than the melt temperature of the composition to be molded throughout the molding process.

Generally the molding parts are maintained at a temperature above the melting temperature of the composition for at least 30 seconds, suitably for at least 150 seconds following introduction of the composition to be molded into the spacing between the first and second molding parts, this typically includes the compression phase during which the first and second molding parts are in the compressed position.

Typically the molding parts are maintained at a temperature of at least 10° C. greater than the melting temperature of the composition to be molded for at least 5 minutes prior to introduction of the composition to be molded into the spacing between the first and second molding parts.

Suitably the molded parts may be allowed to cool until they return to room temperature. Typically this cooling step may take up to 500 seconds but suitably less than 30 seconds.

Typically the contact lens mould is heated to a temperature of between 85° C. to 110° C. prior to introduction of the composition to be moulded. Typically the molten composition to be moulded is at a temperature of between 120° C. to 150° C. for introduction to the cavity.

The composition to be molded is typically cooled under compression. The first and second molding parts are moved into the uncompressed position following formation of the contact lens.

Typically the cavity is chilled to between −15° C. to −30° C. during the cooling step for formation of the contact lens. Typically the temperature of the contact lens mould is reduced until the contact lens is at a temperature below −10° C.

Figure 4A:
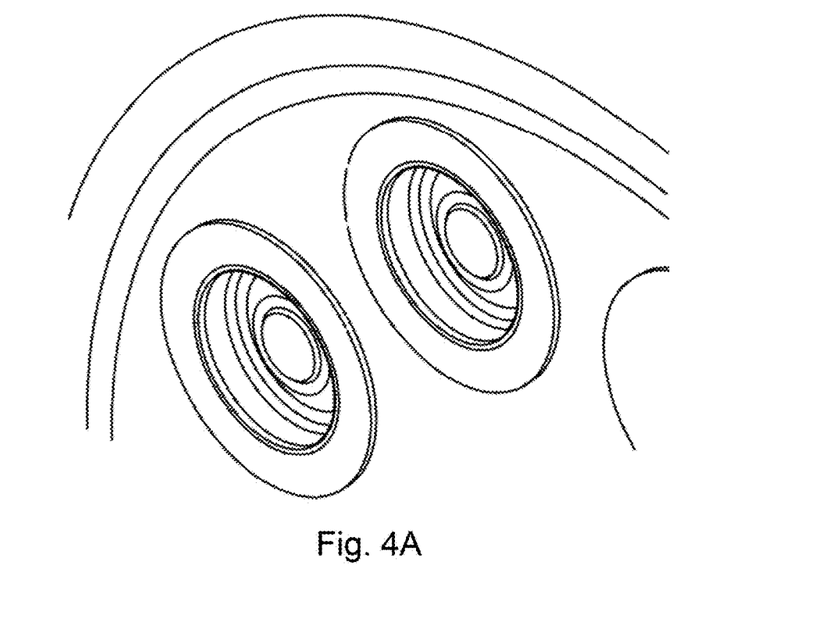
Figure 4B:
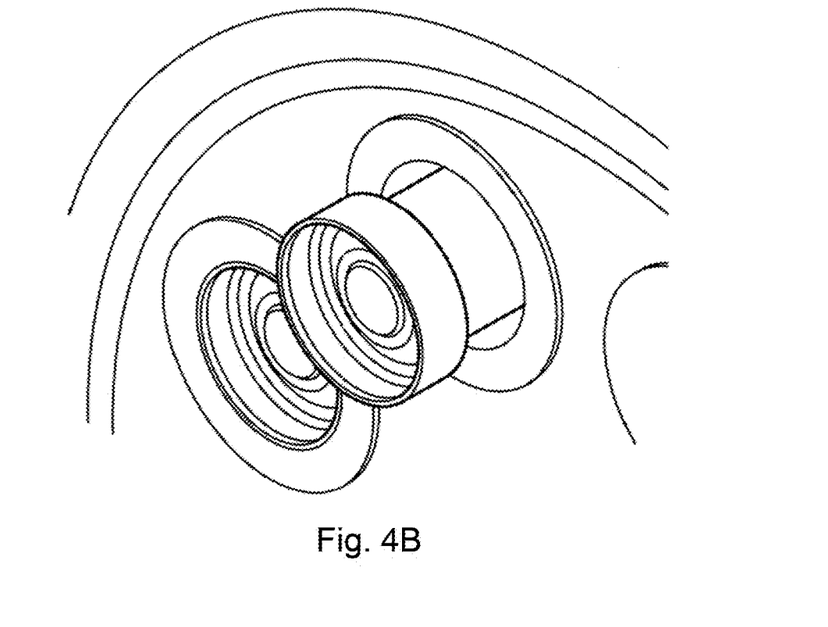

According to one embodiment, after the contact lens has been moulded and cooled, the contact lens mould is detached from the moulding apparatus, typically using a forward movement of the moulding parts such that the moulding parts and contact lens assembly is rapidly removed from the moulding apparatus (see FIG. 4A and FIG. 4B). Typically the contact lens so formed is typically in the form of a contact lens assembly, generally the contact lens assembly as described herein.

As noted herein, the provision of a flash ring allows the contact lens assembly of the present invention to be removed from the contact lens mould without the application of forces which would cause damage or distortion to the contact lens.

The contact lens may be removed from the moulding parts using any suitable method (for instance mechanically or manually). According to one embodiment, the first or second moulding part is removed from the contact lens. The contact lens may then be removed from the other moulding part using any suitable method (for instance mechanically or manually), typically using a robot with an end of arm gripper.

The contact lens may be ejected from the molded parts by removing one or both molding parts at elevated speed and/or increased pressure.

Generally more than one contact lens assembly is removed; typically more than one contact lens assembly is connected by one or more runners.

Generally the contact lens of step 4 is in the form of the contact lens assembly as described above and the method includes the steps of:

5. removing the contact lens assembly from the apparatus; and
6. separating the contact lens from the contact lens assembly, generally by punching the contact lens from the contact lens assembly.

According to one embodiment, the contact lens may be removed from the contact lens assembly using a cutting mechanism, the application of heat or laser along the connecting portion, or the application of a vacuum. Such removal methods do not maintain the edge profile of the lens as molded. In particular, cutting and laser procedures essentially form a new edge to the lens.

According to one aspect of the present invention the contact lens is removable from the contact lens assembly through punching. This is due to the thickness of the connecting portion relative to the thickness of the outer edge of the contact lens. The punching procedure ensures that the edge profile of the contact lens formed during the molding procedure is maintained.

A reliable method of forming an injection molded contact lens having defined, predictable dimensions and edge profile is thus provided.

Generally the punching procedure involves the steps of placement of the contact lens assembly on a die and punching down on the contact lens using a punch. As the connecting portion of the contact lens assembly is thinner than the outer edge of the contact lens, the connecting portion tends to break releasing the contact lens from the contact lens assembly, whilst maintaining the edge profile of the contact lens as molded.

Typically the die comprise a concave contact lens receiving portion, suitably having the same curved profile as that desired for the outward facing surface of the contact lens. Accordingly the contact lens assumes the desired curved profile.

Generally the die includes a resting portion on which the connecting portion of the contact lens assembly may be placed during the punching procedure. The connecting portion is retained by the resting portion whilst the contact lens is pushed into the concave contact lens receiving portion. The contact lens is released from the contact lens assembly accordingly.

The punch typically comprises a convex contact lens punching portion suitably having the same curved profile as that desired for the on eye surface of the contact lens. Accordingly the contact lens assumes the desired curved profile.

Suitably the punch may include a vacuum/blow facility allowing a vacuum to be applied from the punch and/or air to be blown from the punch. Typically a vacuum may be applied from the punch, allowing the contact lens to be sucked from the contact lens receiving portion of the die to the punch. The blowing mechanism allows the contact lens to be removed from the punch, typically directly into a vial avoiding handling which may affect the physical properties of the contact lens.

According to an aspect of the present invention there is provided a contact lens obtainable by the methods described herein.

According to a further aspect of the present invention there is provided a contact lens molded from the apparatus described herein, or according to the method described herein wherein said contact lens does not include a witness mark.

The present invention overcomes several of the problems which have been long felt in this art. The formation of a contact lens assembly comprising a flash ring provision of a flash ring promotes clean and complete ejection of the contact lens from the first and second moulding parts. The connecting portion of the contact lens assembly is thinner than the outer edge of the contact lens and this allows the contact lens to be punched from the contact lens assembly whilst retaining the edge profile of the contact lens as moulded.

Any void, protrusion or surface defect associated with the gate providing ingress of the composition to be moulded to the moulding area is retained on the flash ring ensuring that the contact lens does not include any witness mark associated with the gate.

The cavity between the first and second molding parts need not be filled under elevated pressure as the compression of the first and second molding parts ensures that the cavity is filled. This is generally done above the melt temperature of the composition to be moulded to prevent any distortion of the contact lens.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

Throughout the description and claims of this specification, the words "comprise" and "contain" and variations of the words, for example "comprising" and "comprises", mean "including but not limited to", and are not intended to (and do not) exclude other moieties, additives, components, integers or steps. All documents referred to herein are incorporated by reference.

The present invention will now be described by way of example only with reference to the accompanying figures in which:

FIG. 4A and 4B show schematic representations of the apparatus of the present invention, FIG. 4A shows the first and second molding parts attached to the molding base, FIG. 4A shows the first and second molding parts removed the molding base;

Figure 1:
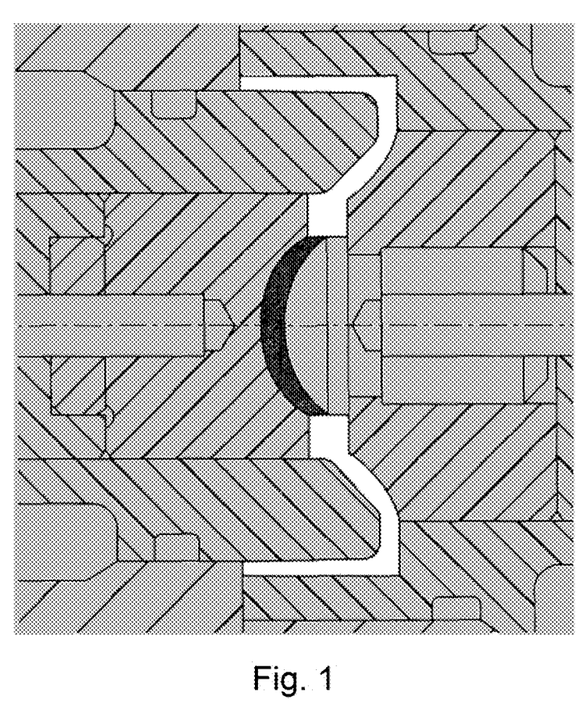
FIG. 1 shows a cross-section of the apparatus of the present invention including composition to be moulded; the solid white section represents the Flash Ring as described and the solid black section represents the Contact Lens area.
Figure 2:
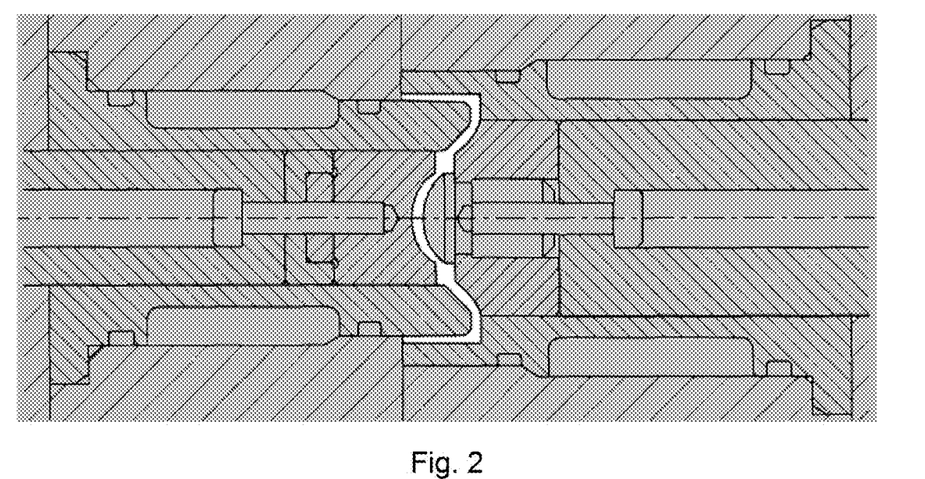
FIG. 2 shows a cross-section of the apparatus of the present invention wherein the first and second molding parts are in uncompressed position.
Figure 3:
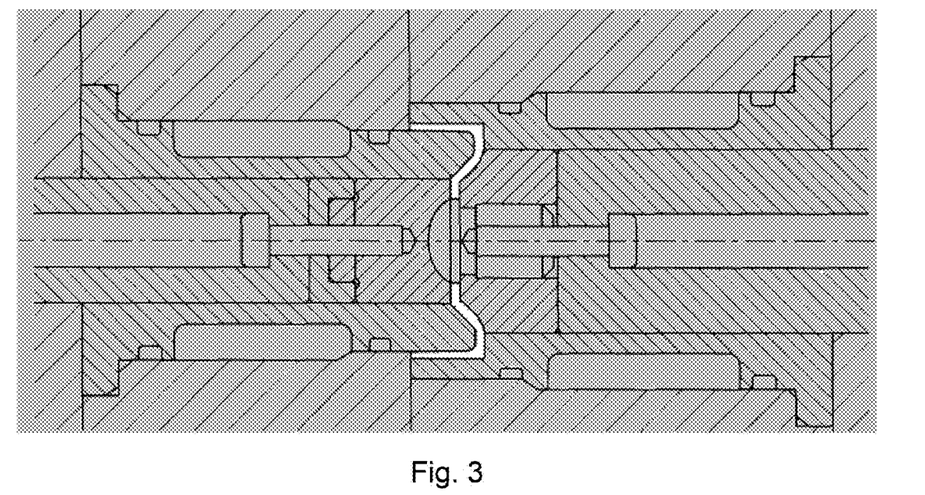
FIG. 3 shows a cross-section of the apparatus of the present invention wherein the first and second molding parts are in compressed position.
Figure 6:
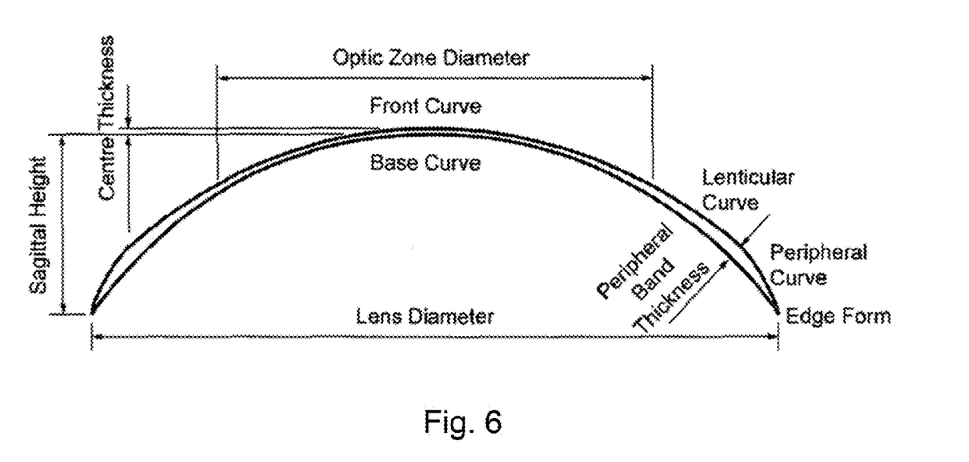
FIG. 6 shows a cross-section of a contact lens according to the present invention.

As seen in FIGS. 2 and 3, a spacing of around 1 mm is provided between the first and second moulding parts in the uncompressed position. This is heated to a temperature above the melt point of the thermoplastic composition to be moulded and then filled or partially filled. Next the first and second moulding parts are moved into a compressed position to form a contact lens mould. There is provided a thin (10-50 micron) circular connecting portion all of the way around the outer edge of the contact lens mould and an overflow portion extending all of the way around the connecting portion. The flash ring is moulded in the overflow portion (see FIGS. 2 and 3). Following compression of the first and second moulding parts, the contact lens mould is maintained at a temperature around 10° C. higher than the melting temperature of the thermoplastic composition. The contact lens mould is then cooled down to a temperature below the melting temperature of the thermoplastic material, causing the thermoplastic material to solidify and form the contact lens assembly. The contact lens assembly comprises a contact lens, a connecting portion and a flash ring. The flash ring is bulky compared to the mass of the contact lens and this bulk is used to facilitate subsequent mechanical removal of the contact lens assembly from the contact lens mould. Following removal of the contact lens assembly, the contact lens is punched out of the contact lens assembly. The edge form of the contact lens as formed during the moulding process is maintained following the punching procedure (see FIG. 6).

EXAMPLE 1

Polymer Manufacturing

The polymer batch used to manufacture lenses is shown below.

| Batch Number IM 507 | | |
|---|---|---|
| Material | Target Weight | Actual Weight |
| PEG 7664 | 870 g | 870.11 |

-continued

| Batch Number IM 507 | | |
|---|---|---|
| Material | Target Weight | Actual Weight |
| PEG 3869 | 930 g | 929.93 |
| PEG dme 1000 | 78.284 | 78.30 |
| BHA | 39.142 | 39.1719 |
| TEG | 744.0 | 744.98 |
| DBTDL | 1.9571 | 1.9617 |
| RB4 | 1.5657 | 1.5657 |
| Desmodur W | 1370.218 | 1391.01 |

Where PEG 7664 and PEG 3869 refer to poly ethylene glycol composition having a molecular weight of around 7664 and 3869 respectively. PEG dme refers to a poly (ethylene glycol) dimethyl ether compound having a molecular weight of around 1000. BHA refers to butylated hydroxyl anisole, TEG refers to triethyleneglycol, DBTDL refers to dibutyl tin dilaurate and RB4 refers to reactive Blue 4.

Polymer Preparation

Polymer Batch Number IM 507 was mechanically removed from its billet container and placed into a New Brunswick −80° C. freezer for 24 hours. Once the polymer was removed from the freezer it was ground in a Shini granulator into pellets no more than 6 mm in size this was then sieved to ensure not larger pellet got into the process. The material was then dried in a Summit Systems Rotary Dryer for 4 hours. After 4 hours in the dryer the moisture content of the material was checked using a Brabender Aquatrac unit to ensure that the water content was less the 500 parts per million.

Injection Compression Moulding Process

The thermoplastic polymer was transferred from the storage container to a hopper situated on top of the moulding machine. This material was gravity fed into the moulding machine during the metering phase of the cycle. During this metering phase, the material was introduced into the machine barrel.

In the machine barrel, the temperature of the material was increased to melting point by heater bands around the barrel and by shear heat. Shear heat is generated by the geometry of the feed screw within the machine barrel. During the operating cycle molten plastic was pushed from the barrel into the hot runner system. The hot runner system was maintained at the temperature of the material melt point was passed into the runner feed system.

Molten material passes from the runner feed system, through a gate, into the overflow portion, and from there into the spacing between the first and second moulding parts in an uncompressed position. The contact lens mould and overflow portion were heated to 95° C. which allowed the thermoplastic material to flow freely into the spacing between the first and second moulding parts in the uncompressed position at a rate of 1 mm per second until the spacing between the first and second moulding parts was full. After filling the spacing between the first and second moulding parts, the machine servo ejector was moved forward to compress the first and second moulding parts in a forward motion at 0.1 mm per second over a distance of 1 mm movement to give the desired lens centre thickness of 90 microns after which the moulding was cooled to −15° C. and −30° C.

After 260 seconds of cooling time, the apparatus was opened leaving the contact lens mould located on the fixed half stripper plate. A robot entered the space between the mould faces and then the End of Arm Tooling griped the mouldings & runner. The fixed half stripper plate then retracted to leave the robot in possession of the mouldings & runner. The robot deposits the mouldings & runner onto a Drop Plate at the side of the moulding machine within the guarded area. The robot then returned to a home position above the mould for the start of the next cycle.

Lens Removal Process

Figure 5:
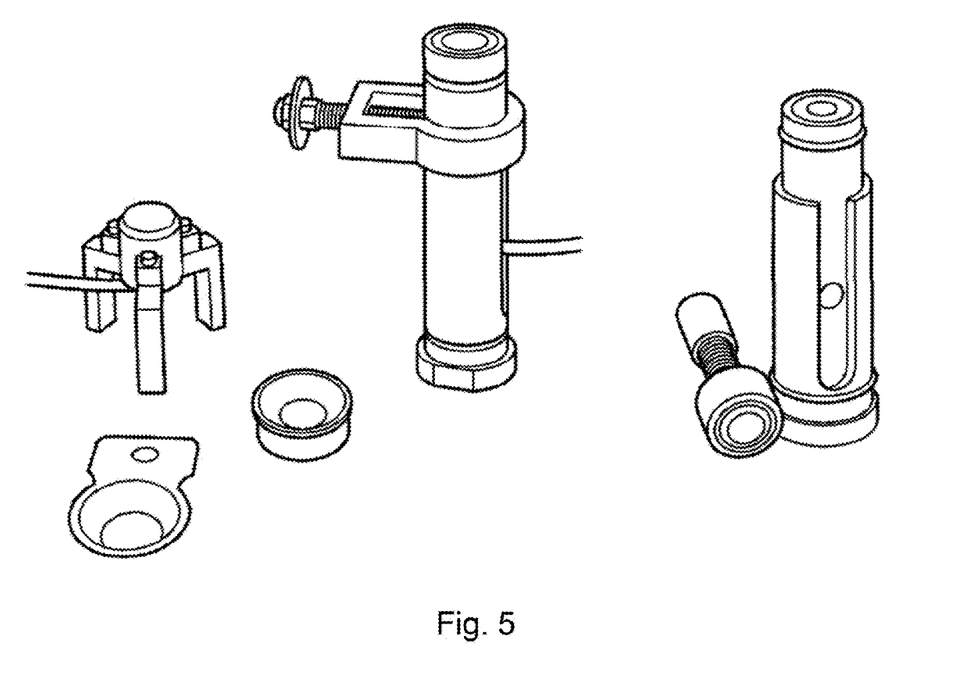
FIG. 5 shows the first and second molding parts of the present invention and a spring loaded punch to remove the contact lens from the associated flash ring.

The contact lens was removed from the contact lens assembly by placing the assembly on a die, and punching the contact lens from the assembly. The connecting portion broke during the punching procedure. A vacuum was applied from the punch, and the contact lens was sucked from the die to the punch. The vacuum was then turned off, and air was blown out of the punch to allow the transfer of the contact lens from the punch to an empty vial. The vial is then filled to the required level with saline solution (see FIG. 5).

Lens Inspection

The lens was hydrated in the saline solution for approximately 2 hours the lens was then ready for basic checks (focus, thickness, diameter, circularity, flash, warping, damaged edges, etc.).

Various modifications and variations of the described aspects of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes of carrying out the invention which are obvious to those skilled in the relevant fields are intended to be within the scope of the following claims.

The invention claimed is:

1. A contact lens assembly comprising a contact lens having an outer edge, a flash ring disposed around the outer edge of the contact lens and a connecting portion connecting the flash ring to the contact lens, wherein the thickness of the connecting portion is less than the thickness of the outer edge of the contact lens and wherein the thickness of the connecting portion is 10 to 20% thinner towards the outer edge of the contact lens than towards the flash ring portion.

2. A contact lens assembly comprising a contact lens having an outer edge, a flash ring disposed around the outer edge of the contact lens, and a connecting portion connecting the flash ring to the contact lens wherein the mass of the flash ring is at least forty times greater than the mass of the contact lens.

3. The contact lens assembly as claimed in claim 1 wherein a witness mark is provided on the flash ring.

4. The contact lens assembly as claimed in claim 1 wherein the outer edge is 0 to 1 mm from the outer circumference of the contact lens.

5. The contact lens assembly as claimed in claim 1 wherein the thickness of the outer edge is 60 to 100 μm.

6. The contact lens assembly as claimed in claim 1 wherein the thickness of the connecting portion is 10 to 50 μm.

7. The contact lens assembly as claimed claim 1 wherein the thickness of the connecting portion is 50% or less than the thickness of the outer edge of the contact lens.

8. The contact lens assembly as claimed in claim 1 wherein the mass of the flash ring is more than fifty times greater than the mass of the contact lens.

9. A contact lens injection molding apparatus comprising first and second molding parts moveable relative to each other between a compressed and an uncompressed position, and an overflow portion disposed proximal to the outer edges of the first and second molding part, wherein in the compressed position a contact lens mold is provided, an outer edge of the first molding part is disposed 1 to 50 μm from an outer edge of the second molding part, and the entire outer edge of the first molding part is disposed at a substantially constant distance from the entire outer edge of the second molding part, wherein a composition to be molded may move from the spacing between the first and second molding parts to the overflow portion, wherein the overflow portion defines a cavity having a volume at least forty times greater than the volume of the contact lens mold provided between the first and second molding parts in the compressed position, and wherein the contact lens injection molding apparatus provides a contact lens assembly comprising a contact lens having an outer edge, a flash ring disposed around the outer edge of the contact lens, and a connecting portion connecting the flash ring to the contact lens wherein the mass of the flash ring is at least forty times greater than the mass of the contact lens.

10. The apparatus as claimed in claim 9 wherein a composition to be molded can move from the spacing between the first and second molding parts during movement of the first and second molding parts from an uncompressed to a compressed position.

11. The apparatus as claimed in claim 9 wherein the first and second molding parts are separated by 0.5 to 1 cm in the uncompressed position, and are separated by less than 200 μm in the compressed position.

12. A method of forming a contact lens comprising the steps of:
   1. providing a contact lens injection molding apparatus comprising first and second molding parts moveable relative to each other between a compressed and an uncompressed position, wherein in the compressed position, an outer edge of the first molding part is disposed 1 to 50 μm from an outer edge of the second molding part, and the entire outer edge of the first molding part is disposed at a substantially constant distance from the entire outer edge of the second molding part;
   2. providing a molten composition to be molded in a spacing between the first and second molding parts in the uncompressed position;
   3. moving the first and second molding parts into the compressed position; and
   4. cooling the composition to be molded to form the contact lens;
   5. removing a contact lens assembly from the apparatus; and
   6. separating the contact lens from the contact lens assembly, by punching the contact lens from the contact lens assembly using a punch and die assembly, the die comprising a concave contact lens receiving portion and the punch comprising a convex contact lens punching portion;
   wherein the contact lens assembly comprises the contact lens having an outer edge, a flash ring disposed around the outer edge of the contact lens, and a connecting portion connecting the flash ring to the contact lens wherein the mass of the flash ring is at least forty times greater than the mass of the contact lens.

13. The method as claimed in claim 12 wherein the concave contact lens receiving portion of the die has the same curved profile as that desired for the outward facing surface of the contact lens and the convex contact lens punching portion of the die has the same curved profile as that desired for the on eye surface of the contact lens.

14. The method as claimed in claim 13 wherein the punch includes a vacuum/blow facility allowing the controlled movement of the contact lens from the die to a storage medium.

15. The contact lens assembly as claimed in claim 2 wherein a witness mark is provided on the flash ring.

16. The contact lens assembly as claimed in claim 2 wherein the mass of the flash ring is at least sixty times greater than the mass of the contact lens.

\* \* \* \* \*